United States Patent [19]

Husted

[11] Patent Number: 4,470,628
[45] Date of Patent: Sep. 11, 1984

[54] RETRACTABLE AIR DEFLECTOR

[76] Inventor: Myron J. Husted, P.O. Box 317, Fairbanks, Ak. 99701

[21] Appl. No.: 316,774

[22] Filed: Oct. 30, 1981

[51] Int. Cl.³ .............................................. B62D 35/00
[52] U.S. Cl. .................................................. 296/1 S
[58] Field of Search ............... 296/1 S, 91; 105/2 R, 105/2 A; 224/316

[56] References Cited

U.S. PATENT DOCUMENTS

| | | | |
|---|---|---|---|
| 3,977,716 | 8/1976 | Whited | 296/91 |
| 3,999,796 | 12/1976 | Greene, Sr. et al. | 296/1 S |
| 4,084,846 | 4/1978 | Wiley, Jr. et al. | 296/1 S |
| 4,141,580 | 2/1979 | Ivan | 296/1 S |
| 4,153,288 | 5/1979 | Mueller | 296/1 S |
| 4,156,543 | 5/1979 | Taylor et al. | 296/1 S |
| 4,375,898 | 3/1983 | Stephens | 296/1 S |

*Primary Examiner*—Robert B. Reeves
*Assistant Examiner*—Dennis H. Pedder
*Attorney, Agent, or Firm*—Richard L. Miller

[57] ABSTRACT

An air deflector mountable upon a truck cab roof so as to deflect air away from a front of the truck body; the deflector including a mechanism to angularly adjust its side and upper surfaces for full air deflection with minimum drag.

2 Claims, 6 Drawing Figures

RETRACTABLE AIR DEFLECTOR

This invention relates generally to the accessories for automotive trucks. More specifically it relates to air deflectors.

BACKGROUND OF THE INVENTION

It is well known that the high, wide front wall of a truck body creates a considerable drag on the vehicle's forward travel, as this wall strikes flat against the air in front hereof. This drag slows up the vehicle's forward progress, so that more fuel must be burned in order to keep the truck travelling at an efficient rate of speed. This increased use of fuel is objectionable, because fuel is expensive, and this situation is accordingly in need of an improvement.

SUMMARY OF THE INVENTION

Therefore, it is a principal object of the present invention, to provide a stream-lined air deflector which is mountable upon the narrower and lower roof of the truck cab, and which deflects the forward air sidewardly and upwardly away from this truck body front wall, so as to reduce the air resistance in front as the vehicle travels ahead along a road.

Another object is to provide an air deflector which is adjustable in stream-line shape, so as to suit vehicles of different sizes of truck body front wall, in order that it is a perfect shape to deflect the front air just enough so as to clear the body front wall and pass around the sides and over a top of the truck body as the vehicle travels ahead.

Yet a further object is to provide an air deflector which accordingly is adjustable in stream-line shape so as to be set up for the usual cruising speed of the vehicle, in order that the approaching front air is deflected at a speed rate so that the deflected air clears the edges of the forwardly moving body front wall as it advances ahead.

Yet a further object is to provide an air deflector which accordingly by being adjustable, prevents the use of an excessive over-stream-lined deflector for the specific vehicle, such as which, while deflecting front air, would be at too great an inclined angle, and thus itself came a drag.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 2 is a rear perspective view of the frame structure of one embodiment of invention.

FIG. 3 is a plan view thereof, shown with the covering panels removed.

DETAILED DESCRIPTION OF THE PREFERRED EMBODIMENTS

Figure 1:
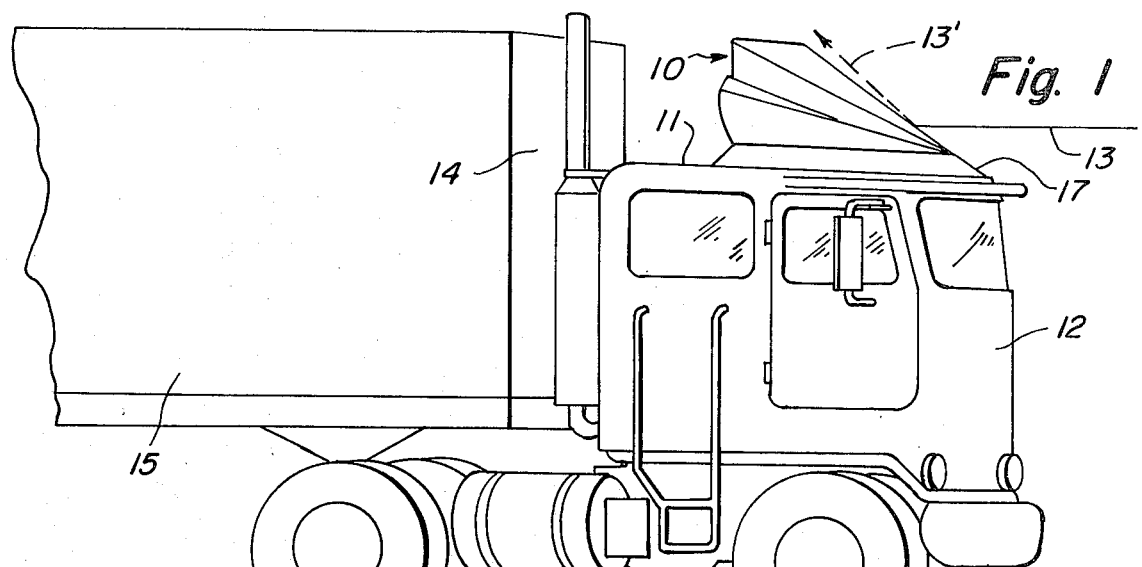
FIG. 1 is a side perspective view of the invention installed upon a truck cab.
Figure 4:
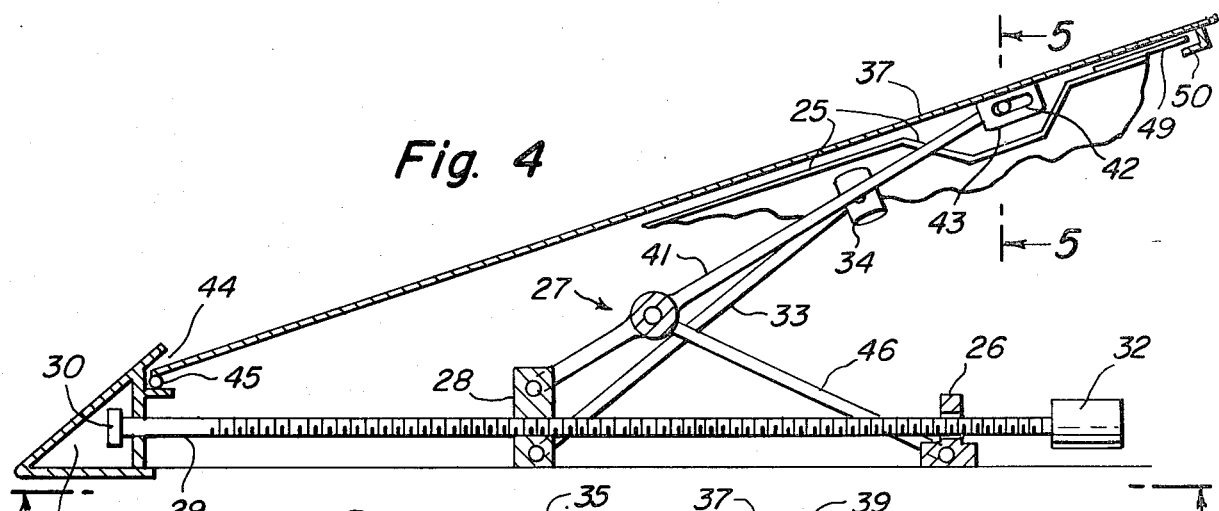
FIG. 4 is a side cross sectional view taken on line 4—4 of FIG. 6 and showing another embodiment.
Figure 5:
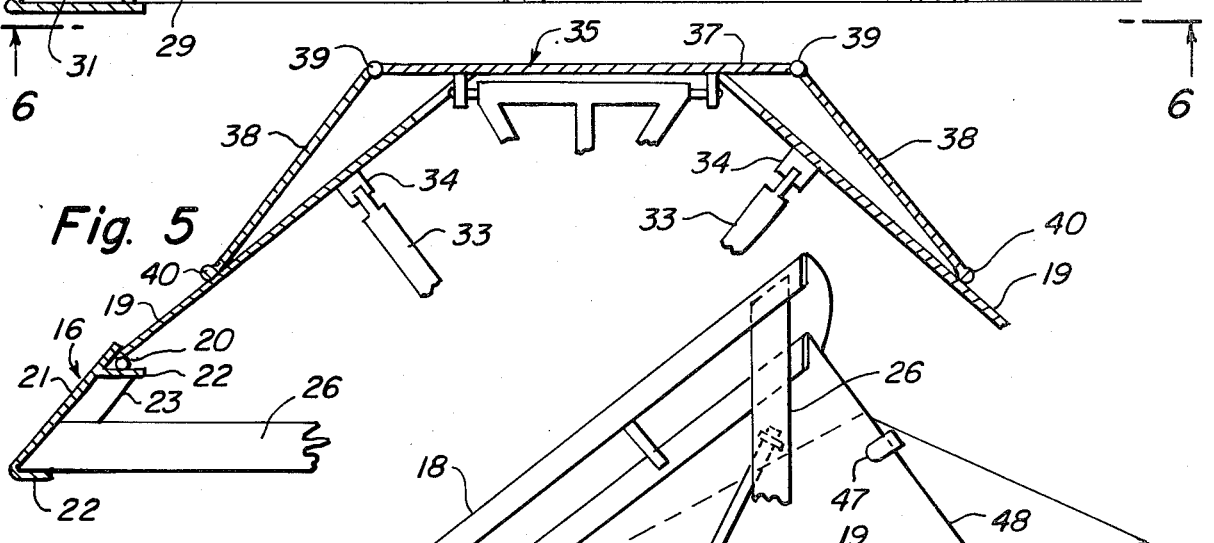
FIG. 5 is a fragmentary cross sectional view taken on line 5—5 of FIG. 4.
Figure 6:
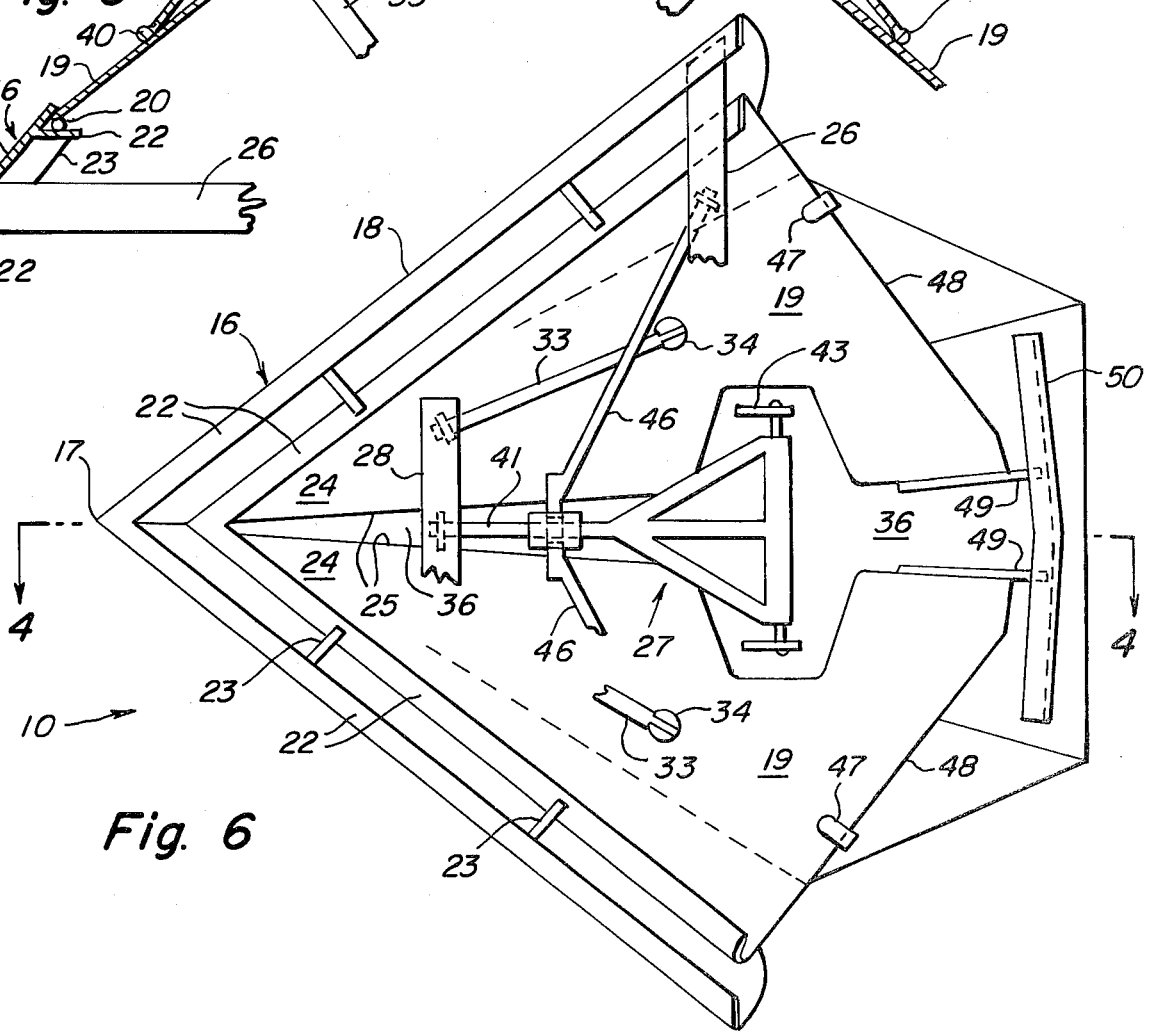
FIG. 6 is a fragmentary bottom view of the device, and showing principally only the moving parts of the mechanism.

Referring now to FIG. 1 and 4–6 of the drawings in greater detail, the reference numeral 10 represents a retractable air deflector according to the present invention, and which may be installed upon a roof 11 of a truck cab 12 in order to deflect air 13 upwardly at 13', preventing the air from striking the front wall 14 of the truck body 15.

The air deflector is constructed with a V-shaped base frame shown generally at 16 which is secured directly on the cab roof, and is positioned so that an apex point 17 thereof extends forwardly toward the approaching air 13. The frame is comprised of two straight side rails 18 which junction at the point 17, and a lower flat panel 19 is pivoted along an upper edge of each rail by means of hinges 20. Each side rail is comprised of an inclined side wall 21 integral with upper and lower flanges 22 and ribs 23 between the flanges. The panels 19 are each generally triangular in shape (as shown in FIG. 9) with one corner 24 of each being at the apex of the frame, and one longitudinal side edge 25 of one panel 19 abutting the edge 25 of the other panel 19 when both of the panels are pivoted into a common flat horizontal plane. A cross beam 26 is fixedly secured between the side rails 18.

The panels 19 are are pivotable upwardly from the above-described horizontal plane position by means of a captive screw mechanism 27, which is supported on the cross beam 26 and on a slidable block 28.

The mechanism 27 includes a threaded rod 29 having an enlarged head 30 at one end for being held axially inside the apex 31 of the frame, while the rod is free to be rotated manually by means of a handle 32 affixed on the rod opposite end. The block 28 is threaded on the rod 29 so as to be slidable along the rod when the handle 32 is turned. A pair of braces 33 are pivotally attached at one end on the block 28, and the other end of braces are pivotally attached at 34 to an underside of each panel 19 so as to cause the panels to be raised or lowered a selected distance, as desired.

A central panel unit 35 rests on top of the two panels 19, so as to cover the gap 36 between the edges 25 of the two panels 19. The panel unit comprises a triangular, flat, central panel 37 pivotally attached along two side edges to an upper pair of triangular, flat, side panels 38 by means of hinges 39. One side edge 40 of each side panel 38 is rounded so as to slide upon the upper side of the panels 19.

A single brace 41, pivotally attached at one end to the block 28, is pivotally supported at its opposite end in a slot 42 of a bracket 43 secured to an underside of the central panel 37, so that the panel unit 35 is likewise raised or lowered together with the panels 19. An apex of the panel unit is pivoted in a recess 44 of the apex 31 and additionally may be attached thereto by a hinge 45.

A pair of auxiliary braces 46 are additionally pivotally attached to the cross beam 26 and slidable along an intermediate portion of the brace 41, for strengthening purposes.

The central panel unit 35 includes a clip 47 on an underside of each side panel 38 for clipping around a rear edge 48 of the panels 19 which slide in the clips. Additionally a rearward projection 49, affixed to each panel 19, is slidable in a grooved bracket 50 affixed to an underside of the central panel 37. The clips 47 and bracket 50 secure the assembly from breaking up in a high wind. The block 53 can be used to fix the device onto the roof, using any well known mechanism. Other attaching mechanisms can be used as well.

FIGS. 2 and 3 illustrate an alternate design 10' having a slight variation in the actual construction of the retractable air deflector, however, the same, above-described operational structure is included therein. In this embodiment, most items are similar to that of the previous embodiment described. However, the hinges 20' are localized at a particular location, and the brace arrangement 41', 43', 54 and 55 form a slightly different embodiment which effectively serves to operate in a similar manner as the first embodiment. There are two arms 41' in this embodiment, and a continuous bar arrangement 43' rather than the separate slide connectors 43, in which the ends of the arms 41' pivot on 55 within the brace 54. Other items are substantially identical as the first embodiment and are so indicated by reference numeral.

In operative use, it is now evident that the air 13 struck by the air deflector is deflected as air stream 13' that passes over a top or around the sides of the truck body instead of striking the body front wall 14.

While certain novel features of this invention have been shown and described and are pointed out in the annexed claims, it will be understood that various omissions, substitutions and changes in the forms and details of the device illustrated and in its operation can be those skilled in the art with out departing from the spirit of the invention.

I claim:

1. A retractable air deflector for installation upon the roof of a truck cab, comprising in combination, a stationary, V-shaped fixed frame for resting upon said roof and having a pair of side rails diverging from an apex, a pair of triangular lower flat panels, first hinge means for hingedly connecting the lower edge of each flat panel to a corresponding side, rail confronting edges of said lower flat panels being pivotally separable from each other, a covering member overlying said lower flat panels including a central triangular panel and a pair of upper side panels, said central panel spanning said confronting edges of said lower flat panels, second hinge means for hingedly coupling the apex of said triangular central panel to the apex of said frame, third hinge means for hingedly coupling said upper side panels respectively from the side edges of said central panel, the side distal edges of said upper side panels capable of sliding along the top surface of said lower side panels, a captured screw mechanism coupled to said fixed frame, a block threaded onto said captured screw mechanism, handle means for rotating said captured screw mechanism to move said block longitudinally along said captured screw mechanism, a first brace pivotally connected between said block and said lower flat panels, a second brace pivotally connected between said block and said central panel, whereby rearward advancement of said block along said screw mechanism simultaneously raises said lower flat panels and said covering member to thereby increase both the height and the arcuate spread of the deflector without increasing its width.

2. A retractable air deflector as in claim 1, and further comprising first clip means at the rear end of said lower flat panels for slidably engaging said central panel to prevent liftoff of said central panel from said lower flat panels, and second clip means adjacent the edges of said upper flat panels for slidably engaging said lower side panels to prevent liftoff of said upper flat panels from said lower side panels.

* * * * *